Oct. 3, 1944. E. F. KLEIN ET AL 2,359,314
ADHESIVE SHEET
Filed Oct. 21, 1939 2 Sheets-Sheet 1
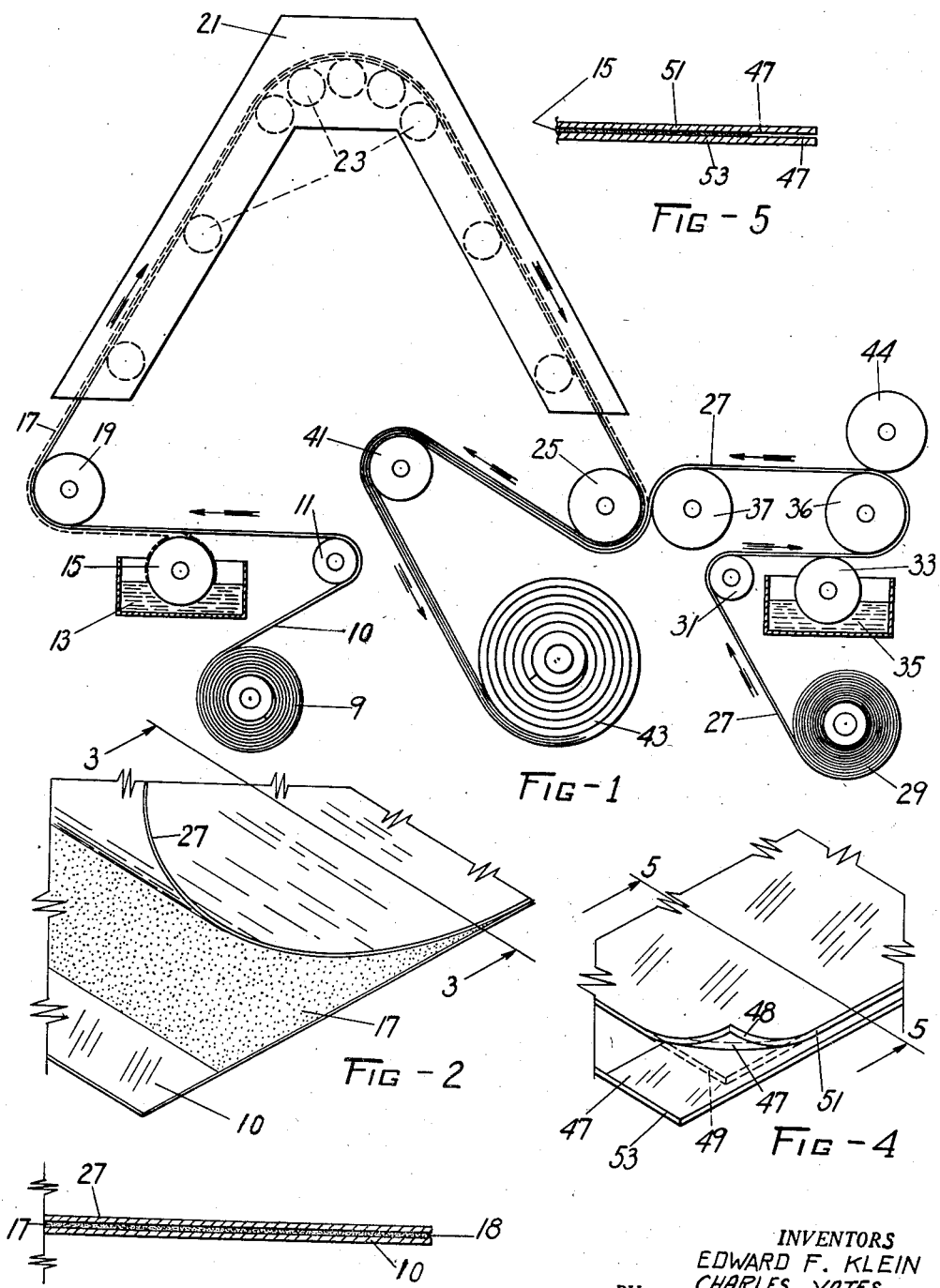
INVENTORS
EDWARD F. KLEIN
CHARLES YATES
BY
ATTORNEY

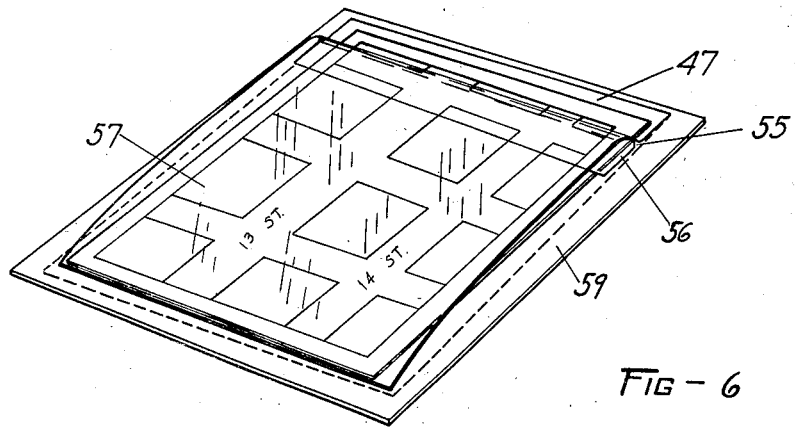
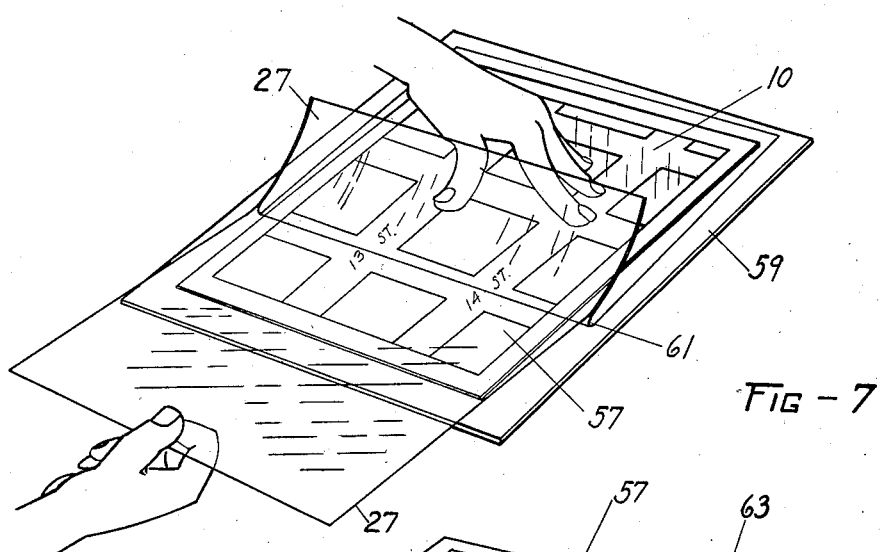
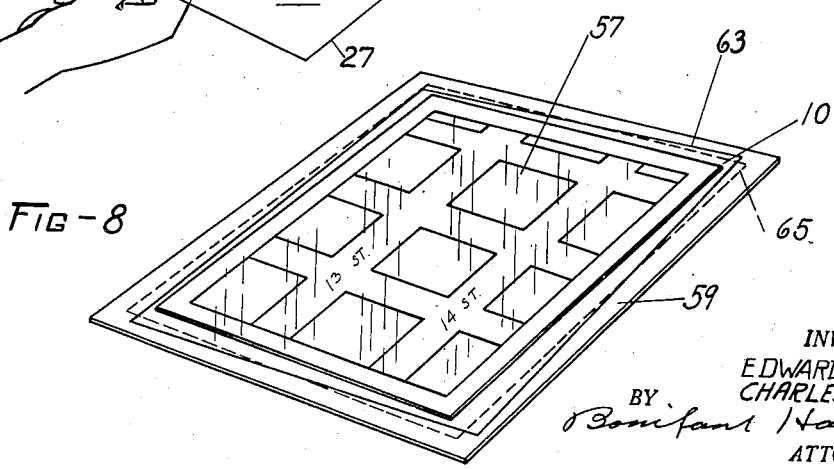

Patented Oct. 3, 1944

2,359,314

UNITED STATES PATENT OFFICE 2,359,314

ADHESIVE SHEET

Edward F. Klein and Charles Yates, Perth Amboy, N. J., assignors to Beutex Corporation, a corporation of New Jersey Application October 21, 1939, Serial No. 300,646

5 Claims. (Cl. 117—122)

For the past several years it has been possible to have printed matter, pictures and the like, of considerable size, covered for protection with thin transparent sheeting such as "Cellophane," cellulose acetate, or the like, by a process known as laminating. A heat-sealing adhesive is used and the machine by which the work is done runs at high speed, turning out several thousand square feet of the laminated product per hour.

This process is very satisfactory for the laminating of large quantities of a product of any particular size, but it is both uneconomical and impractical when only a small number or possibly only one sheet is to be covered.

The present invention provides a product which is applicable manually without the use of expensive machinery and which produces a finished product equal in quality to the machine-made product.

Generally speaking, in order to accomplish this improved result, a thin sheet of transparent film, such as a sheet of transparent cellulose acetate film, is coated with a normally tacky transparent adhesive, over which is applied a smooth sheet of relatively rigid paper, this paper being treated so as to be removable from the adhesive film with considerable tension.

The tacky adhesive film is to permit bonding of adhesive film to the surface to which it is to be finally attached without the use of heat, which would entail more skill and be less convenient for the user. However, prior to the present invention, a pressure-sensitive laminating of sheets of any appreciable size has been very difficult, due to the difficulty encountered in bringing the two sheets into contact in the exact position desired. When the ratio of thickness to width and length of the sheet applied is not great so that the adhesively coated sheet has considerable rigidity, it can be applied smoothly and evenly without much difficulty; but, however, when the coated sheet is sufficiently large as compared to its thickness, heretofore it has been very difficult to keep the sheet from distorting and becoming bonded firmly at some point where no contact is desired, thereby causing wrinkles and other distortions, and spoiling the work.

In accordance with the present invention, to overcome these difficulties, the smooth, relatively rigid strip sheet is utilized in the laminating of the adhesively-coated sheet to the surface to be covered, and in order to permit smoothing out of irregularities that may have occurred, the adhesive film is of a consistency which permits sliding of the applied film, when freshly put on, if sufficient force is applied to the film in order to position the film properly on the surface, or to remove any slight wrinkles or irregularities in the film, thus permitting a uniform and smooth application of the adhesively coated film to the surface to be covered.

It will be recognized, of course, that in the art of producing adhesive materials, it has been proposed not infrequently to produce a substantially transparent adhesive body usable in various applications as a mending or protective means, wherein the adhesive article comprises a substantially transparent film-like foundation, such as transparent tape to which is applied an adhesive substance, which may be either water-soluble, i. e., it is rendered adhesive when moistened with water, but otherwise normally non-tacky, or a thermoplastic material which also is normally non-tacky, but which is rendered tacky upon the application of heat, or the adhesive material may be pressure-sensitive, which type of material is water-insoluble, substantially non-drying in character, and normally tacky, so that adhesion is secured only by application of slight pressure; and it is by no means a new proposal to produce a tape having a fabric backing with an adhesive substance applied thereto which has a greater adhesion to the fabric backing than to the surface to which the tape is applied so as to leave no tacky residue upon such surface when the tape is removed therefrom.

Such adhesive bodies find wide application and uses, for example, in mending torn papers, or documents, where the adhesive body is transparent, or in rendering such documents tamper-proof; or as sealing means; or as protective coverings where it is desired to afford protection to any given surface which it is desired to maintain free from dirt or dust, such as, for example, maps, documentary records, menus, or the like, while at the same time preserving the legibility of the indicia or wording on the surfaces to which the said means may be applied. These adhesive bodies are freely flexible and are supplied to the trade in the form of sheets and tape, usually in rolls or wound on spools. The fabric backed type of tape referred to above, of course, is not transparent, and an important use thereof is in the application to surfaces to be painted, wherein the strips of tape are applied to selected portions of such surfaces for preventing access of paint thereto. After the painting, the adhering strips are removed from the surfaces and it is desirable that no residue of the tacky or gummy substance be left on the said surface.

In the case of transparent films, such as those produced from cellulosic esters, which are coated with a pressure-sensitive adhesive, there are at least two objections, one being that they become discolored when exposed to light and the air when so exposed over a duration of several months, and lose their transparency; also the bond between the adhesive and the film-base is imperfect, resulting in a relatively easy separation of the adhesive from the base; also, in many instances, the film becomes distorted after it is applied for awhile.

An additional drawback in such pressure-sensitively coated films is that because of the difficulty in handling and applying such material, only the narrow tape-form is available, packaged as rolls upon a spool, but even in such narrow tapes, separation of the convolutions from the roll frequently is difficult. This difficulty of separation of contiguous layers of material of this type inhibits their production in sheet form, as well as the difficulty involved in applying evenly on the given surface, wide widths of such materials.

In their usual form, this type of material is the so-called "mending tape," or even in narrower widths it is used for sealing packages. The discoloration of this standard product is due to the pressure sensitive adhesive having a rubber composition; and this adhesive is not so closely bonded to the film as to prevent a tendency to separate, even though fresh samples show a greater adhesion of the adhesive to the film-base than to a surface to which the tape is applied, so that the said surface will be pulled away from its body and will be found to be adhering to the adhesive if the tape is attempted to be stripped from the surface once it has been applied.

When such tapes are to be unwound from a roll, in order to facilitate such unwinding, in some instances the tape is provided with a non-adhesive tab which is gripped to start the unwinding; and the consumer is advised, when a length of tape has been removed, to turn under the resulting free end of the next length in order to provide a non-adhesive surface for starting the next length. Otherwise, it is very difficult to obtain the necessary initial separation.

The present invention is directed to improvements in transparent films adhesively coated on one side with a transparent pressure-sensitive adhesive, wherein the article is particularly in the form of wide sheets, as distinguished from the usual tape, and wherein the pressure-sensitive adhesive is wholly free from rubber compounds, thereby avoiding discoloration and resultant opacifying of the film after its application to a selected surface, and wherein the pressure-sensitive adhesive is bonded integrally to the film base, thereby obviating any tendency to separation therebetween.

A further object of the invention is to provide sheets of this indicated character having means for preventing adhesion together of sheets when in superposed relation, and which provides a means for applying the sheets evenly and uniformly to the selected surface.

A further object of the invention is to provide pressure-sensitive sheets of the above-indicated character which may be adjusted as to their position relative to a given surface to which they are applied, when they are at first so applied, so that there may be a relative shifting of the applied film and its surface, but wherein the adhesive bond becomes increasingly tight with time.

A still further object of the present invention is to provide an improved pressure-sensitive adhesive composition for use in the above-indicated applications.

Further objects of the invention will become apparent as the description proceeds, and the features of novelty will be set forth in particularity in the appended claims; and the invention accordingly comprises the features of construction, combination of elements, and arrangement of parts, which will be exemplified in the construction hereinafter set forth, and the scope of the application of which will be indicated in the claims.

The objects of the invention are attained importantly by the application to a freely flexible, transparent, non-porous, film-like base, such as a sheet of cellulose acetate, of a transparent adhesive, the adhesive being applied to the transparent base in such a manner as to bond the adhesive integrally to the base. This is done either by applying the adhesive composition to its base while the latter is still tacky, as the sheet is formed from its solution, or by incorporating a suitable solvent for the base material with the adhesive composition, so as to soften and to render tacky the surface of the base as the adhesive composition is applied, whereupon, when the base hardens or the solvent evaporates, the adhesive material will have entered into the surface of the base sheet and will have become bonded integrally therewith. The adhesive surface then is covered with a readily removable strip sheet which covers the adhesive surfaces and separates the same when the present improved product is in superposed sheets or rolls, thereby maintaining the non-adhesive surface out of contact with the adhesive material until the material is ready for use, thereby enabling the laminated layers to be separated readily, and without tackiness on the uncoated side of the sheet.

This protective sheet for the coated side of the base preferably is treated with an oil or like material which is incompatible with the adhesive coating so as not to merge therewith, and assures the ready removal of the strip sheet from the adhesive coating so as to expose the tacky adhesive for application to the surface to which adherence of the tape or sheet is to be made. In order to facilitate the stripping of the protective covering, the surface of the latter may be rendered uneven, as by crimping or corrugating the strip sheet, so that it may be more readily gripped with the fingers for its removal; or the film sheet may be marginally uncoated with adhesive for facilitating the initial separation, or the backing sheet may be extended at one or both sides of the film sheet, beyond the margins thereof.

The accompanying drawings illustrate one form of the present improved product and the preferred method of its application, it being understood, of course, that many variations in the practicing of the present invention may be made without in any way departing from the scope of the invention.

In the accompanying drawings, Fig. 1 represents a diagrammatic lay-out illustrating the production of the present improved product.

Fig. 2 represents a perspective view of a fragment of the present product, obviously greatly exaggerated in thickness, the view showing the separator or strip sheet partly removed to expose the adhesive coating on the foundation strip.

Fig. 3 represents a sectional view through the present improvement, the view being taken on the line 3—3, Fig. 2, looking in the direction of the arrows and indicating the integral bond between the adhesive coating and the carrier or strip sheet.

Fig. 4 represents a fragmentary view of a modification of the structure of the improved product, wherein the strip sheet is eliminated, parts being broken away for clarity.

Fig. 5 is a sectional view showing details of construction of the modification of Fig. 4, the view being taken on the line 5—5 of Fig. 4, looking in the direction of the arrows, this view as well as Fig. 4 showing the various surfaces much magnified as to thickness.

Fig. 6 is a perspective view representing the first step in the preferred method of applying the sheet of the present invention.

Fig. 7 is a perspective view representing an intermediate stage of application of the sheet.

Fig. 8 is a perspective view showing the completion of the application and the adjustment of the position of the applied sheet relative to the base.

Referring more particularly to the drawings, a transparent, non-porous film-sheet 10, which may be composed, for example, of a cellulose acetate film or the like, regenerated cellulose, or the transparent rubber derivative known in the trade as "Pliofilm" which is shown as being unwound from a roll 9 and after passing around an idler roller 11, is coated with a pressure-sensitive adhesive which is applied as a solution thereof from a bath 13 by a wiping roller 15, the adhesive thereby forming a coating on one side of the transparent sheet 10.

The adhesive composition includes a suitable plasticizer and a solvent which is compatible with both the adhesive and the material of the sheet. That is to say, the solvent maintains the plasticizer in true homogeneous solution, and acts also to dissolve and soften the material of the sheet, which is miscible with the solvent. Such solvents may be, for example, acetone, toluol, xylol, carbon tetrachloride, or the like, and their action is both to hold the adhesive in solution and to dissolve, at least partly, the surface of the sheet, so that as the adhesive composition is applied it becomes fused into and an integral part of the surface of the sheet so that there can be no separation from the sheet short of the destruction of the sheet itself. The coating of adhesive is applied uniformly by the roller 15, and is indicated at 17, the integral bond being designated as 18.

The coated strip passes around an idler roller 19 which engages the uncoated side of the sheet, the sheet then being passed through a drier 21, the sheet being guided and supported through the drier 21 by a series of rollers 23, where the tacky, plastic surface of the sheet is dried, anchoring it to the adhesive coating 17, the drying action preferably being produced by hot air within the drier 21.

The strip sheet 27 is shown as being supplied from a roll 29 from which it passes around an idler roller 31 and thence in contact with an applicator roller 33 which dips into a bath of coating composition 35, which may be conveniently an oil, such as linseed oil, cottonseed oil, or the like, which is incompatible (i. e. immiscible) with the adhesive 17, and, consequently, is inactive with respect to the adhesive, thereby not uniting closely therewith so as to enable a ready stripping of the strip sheet 27 from the adhesive coating 17.

After engaging the applicator roller 33, the strip, or separator, sheet passes around a guide roller 36, which engages the uncoated surface of the sheet, and then around a feed roller 37 which applies the strip sheet to the adhesive coating 17 on the transparent sheet 10, with the coated side of the strip sheet in contact with the adhesive layer 17, there being sufficient pressure between the rollers 25 and 37 so as to cause a relatively superficial adherence between the strip sheet 27 and the adhesive layer 17. This strip sheet may be either transparent or opaque, and either colorless or colored in any suitable manner; and in order to facilitate gripping it with the fingers to remove it when it is ready to apply the sheet 10, the strip sheet 27 may be made with an uneven or irregular surface, such as by embossing, creping, corrugating, or the like.

When the strip sheet 27 has been applied to the adhesively coated sheet 10, the resulting laminated sheet is passed around a supporting idler roller 41 and is rewound upon a roll 43, wherein the adhesive convolutions of the sheets are kept separated by the strip sheet, which maintains the adhesive coating 17 out of contact with the uncoated surface of the sheet in the said convolutions, thereupon enabling the sheet to be unwound freely from the roll.

This strip sheet is sufficiently light-transmitting to enable the surface to which the adhesive film-sheet is to be applied to be visible through the entire laminated structure for guidance in positioning properly the film-base for its application; and the strip sheet constitutes the means for applying the film sheet to the surface to be covered thereby, as will be apparent from the hereinafter-described procedure.

Heretofore, the difficulty of applying wide sheets of adhesively coated film has greatly limited the use of such type of material, it being found almost universally as narrow tape, wide widths being very difficult to handle regardless of the type of adhesive coating. For the proper application of such sheets to the given surface, it is necessary, for close adhesion of the sheets to the surface, that the application be even and free from areas of imperfect contact, which means, of course, that all air be excluded from between the contacting surfaces. This is very difficult to accomplish with the adhesively coated products of the prior art, with the result that inclusions of air occur frequently between the laminations of the adhesive sheet, and the surface to which the sheet is applied, resulting in the presence of "air bubbles" therebetween and areas of imperfect contact between the sheet and the surface to which it is applied.

Also, heretofore, great difficulty has been experienced in precisely applying the adhesive sheet, whether the adhesive be of the "thermoplastic," "pressure-sensitive" or "water-soluble" type, especially if the sheet be of any substantial size or width, one of the characteristics of the adhesives employed heretofore being a tight bond to the surface to which the material is being applied so that if the sheet which is being laid down becomes displaced in its position, it immediately sticks fast and cannot be moved into proper position; and such displacement during application is very easy, and happens frequently. Further difficulty is experienced, especially in attempting to apply large sheets, in applying the sheet without wrinkling or other unevenness being experienced, or the sheet becoming folded and stuck together while it is being applied.

It has been discovered that the procedure of applying the sheets of this invention, as will be described hereinafter eliminates these difficulties, and enables a ready hand lamination to be carried out in an eminently satisfactory manner.

In order to apply the transparent adhesive sheet in the manner of this invention, the strip sheet 27 is separated from the adhesive coating 17 on the transparent film-sheet 10, until a short length of the adhesive coating 17 is exposed. In order to facilitate this separation, a narrow margin of the film is left uncoated with adhesive, as is indicated at 47. The separated edge of the strip sheet is folded back sharply upon itself as is indicated at 55, Fig. 6, to form a tab 36 which is to be gripped and pulled. The film-sheet is then attached to the edge of the surface by means of the exposed edge of adhesive, the strip sheet and its fold being between the film-sheet and the surface to which it is being applied. The strip sheet being sufficiently transparent to render legible any markings or designs 57 on the surface 59 to which the transparent sheet 10 is being applied, there is facilitated the proper positioning of the sheet with reference to such markings.

The attached edge of the transparent sheet 10 is then pressed firmly into contact with the surface 59, and held in position while the fold 56 is pulled with a steady and continuous pull, by the operator reaching under the strip sheet, gripping the fold and pulling steadily thereon along the surface being covered, thereby stripping the strip sheet 27 away from the transparent sheet 10, the latter rolling off the strip sheet under tension as is indicated at 61, and lying flatly and smoothly on the surface 59', in adhesive contact therewith. The amount of tension under which the sheet 10 is applied depends upon the amount of adhesion between the strip sheet 27 and the sheet 10, the closer that adhesion, the greater the force of the pull which is required for their separation and the closer the adhesion between the applied sheet 10 and the surface 59. By this operation the sheet 10 is laid down on the surface without difficulty, evenly, without wrinkling or included air bubbles, and the character of the adhesive is such that if the applied sheet 10 is somewhat mis-aligned with respect to the surface 59, as is indicated at 63, its position may be adjusted at least to some extent when the sheet is freshly applied, as is indicated by the dotted line 65 on Fig. 8.

The strip sheet 27 must be sufficiently thick and stiff to provide adequate reinforcement of the transparent film sheet 10 to prevent wrinkling of the latter, both during handling and during its application, and at all times the strip sheet 27 is much thicker and stiffer than the transparent film sheet 10. Thus, if the film sheet 10 is approximately 0.0015 inch thick, the strip sheet should not be substantially thinner than 0.002 inch in thickness; and as the thickness of the acetate film decreases, the strip sheet is maintained sufficiently heavy to guard against wrinkling of the film. The translucent paper known on the market as "glassine" paper is found in practice to be a very suitable material for the strip sheet.

If desired, the strip sheet 27 may be made wider than the transparent film sheet 10, this permitting any length of the sheet to be cut from a roll 19 while providing always an extending portion of the strip sheet immediately accessible for gripping to start the separation as has been described above; and as has been described above, a portion of the film-sheet at its end may be left free from adhesive.

Figs. 4 and 5 show a modification of the present improved laminated sheet, in which the strip sheet 27 may be eliminated while permitting the assembling of adhesive sheets in such a manner that the adhesive coating thereon will not contact objectionably with uncoated sides or areas of contacting sheets of the assembly.

As is shown in Figs. 4 and 5, two sheets 51, 53, each of which is provided with a coating of adhesive 45, are placed together so that the coated side of each is in contact with the coated side of the other, there being left an uncoated area along at least one edge of the sheets, as is designated at 47, which leaves a free non-adherent area on each sheet which may be gripped with the fingers and pulled apart, an upturned corner being designated at 48 to show the beginning of such a separation, the flat position of the sheet being indicated by the dotted line 49.

In this arrangement, the closeness of the contact between the sheets maintains the adhesive in its originally applied condition for an indefinitely long period of time; and since the uncoated sides of the sheets are disposed outwardly, any contact of the adhesive with the uncoated sides of other sheets is avoided. This arrangement is adapted especially for wide sheets of material.

If it is desired to emboss the surface of the strip sheet 27, there may be provided an embossing roller, such as is indicated in Fig. 1 at 44, which roller may have an irregular or corrugated surface for rendering the separator strip 27 correspondingly irregular in its surface as it passes over the roll and is applied to the coated surface of the transparent sheet 10.

Also, any desired coloring material may be incorporated in the strip sheet and/or film sheet, and any desired printing may be applied to either or both, in the event such be wanted.

The adhesive composition is characterized in being a transparent, non-rubber containing pressure-sensitive adhesive which is integrally bonded to the film sheet by a commingling or fusing of the adhesive material into at least the surface portion of the sheet.

A suitable adhesive material has the following composition, both the preferred amount and permissible range of each material being indicated:

|  | Preferred composition | Permissible range |
| --- | --- | --- |
|  | *Percent* | *Percent* |
| Sulphonamid resin (toluene sulphonamide formaldehyde) | 30 | 30-35 |
| Vinyl resin (polyvinyl acetate) | 6 | 4-10 |
| Ethyl-phthalyl-ethyl-glycollate (or tricresyl phosphate) | 1½ | 1-3 |
| Dibutyl phthalate | 2½ | 1½-5 |
| Acetone | 25 | 15-40 |
| Toluol | 35 | 20-50 |

In the above composition, the sulphonamid resin base produces an adhesive gum which is reinforced and rendered controllable as to tackiness by the inclusion of the vinyl resin, which also is pressure-sensitive. The dibutyl phthalate and the ethyl-phthalyl-ethyl-glycollate are plasticizers while the toluol is a solvent for the polyvinyl acetate, and the acetone is a solvent for both the adhesive components and for the film, and produces the inseparable union between the adhesive and the film; and in practice it is found to be most satisfactory to use a mixture of these solvents rather than either of the solvents alone.

The above adhesive contains no rubber derivatives or compounds, it is entirely transparent and does not discolor or opacify on aging, and when applied to a given surface, such as paper, cardboard, or the like, it adheres thereto by the application of simple pressure, the adhesion being such that the film-sheet may be adjusted as to its position with respect to the surface to which it is applied when the sheet is first applied, but the adhesion becomes increasingly tight as it ages, through capillary flow into the covered surface. The adhesive composition is applied to the film base in amounts not substantially less than eight pounds per three thousand square feet of film surface, after the solvent has evaporated, as a rather heavy coating of adhesive is needed to wet completely the surfaces of both the film sheet and supporting strip sheet. Whenever desired, the tackiness of the composition may be varied by adjusting the amount of plasticizer entering the composition, so that if desired, an initial separation of the strip sheet from the film sheet may be effected by the suitable application of friction, as by forcibly rubbing the composite sheet between the thumb and forefinger of an operator, thereby enabling an effecting of the initial separation of the strip sheet from the film sheet to start the lamination of the film sheet to whatever surface is to be protected.

The adhesive composition may be caused to enter into the material of the sheet and to become fused therewith also by applying the adhesive to the transparent sheet as the latter is formed from its solution and while the surface of the newly produced or "nascent" sheet is still tacky. The effect of the solvents incorporated in the adhesive will be to increase the tackiness of the newly formed sheet and to cause an intimate entry of the adhesive therein, so that an integral bond is produced when the sheet hardens.

What is claimed is:

1. A coated adhesive sheet comprising a base and an adhesive, said base being a sheet of a cellulosic compound, said adhesive being bonded to said base and comprising the following; a sulphonamide type resin and poly vinyl acetate, said adhesive being normally tacky.

2. A coated adhesive sheet comprising a base sheet of a cellulosic compound and a coating on one face thereof including an adhesive bonded with the base sheet, said base sheet being of cellulose acetate and said adhesive comprising a non-aqueous normally adhesive sulphonamide type resin, partly dissolved into the adjacent face of the cellulose acetate sheet and non-aqueous, normally adhesive poly-vinyl acetate, said adhesive being normally tacky.

3. An adhesive sheet of cellulose acetate, and a pressure-sealing adhesive coating composition integrally bonded to one side thereof and comprising the dried reaction product of the following ingredients: a normally adhesive pressure sealing sulphonamide gum resin, a normally adhesive pressure-sealing polyvinyl acetate resin, and plasticizers, said adhesive being normally tacky.

4. An adhesive cellulosic sheet carrying a normally adhesive, pressure-sealing sulphonamide resin, polyvinyl acetate and one or more of the following plasticizers: dibutyl phthalate, ethyl phthalyl, ethyl glycollate, the said composition being integrally bonded to the cellulosic sheet, said adhesive being normally tacky.

5. An adhesive transparent cellulose acetate film-sheet carrying a normally tacky, pressure-sealing adhesive coating composition therefor for bonding adhesively the film sheet to a surface, the said adhesive coating composition comprising the dried reaction product of the following ingredients: a normally tacky and adhesive pressure-sealing sulphonamide resin, a polyvinyl acetate resin, and one or more of the following plasticizers: ethyl phthalyl, ethyl glycollate, and dibutyl phthalate, the said adhesive composition being bonded integrally to the film sheet.

EDWARD F. KLEIN.
CHARLES YATES.